Sept. 12, 1950  F. PERLIN  2,521,743
POCKET CAMERA
Filed Nov. 28, 1947  2 Sheets-Sheet 1

FIG. 6α

INVENTOR.
FRED PERLIN
BY
Maxwell E. Sparrow
ATTORNEY

Sept. 12, 1950 F. PERLIN 2,521,743
POCKET CAMERA

Filed Nov. 28, 1947 2 Sheets-Sheet 2

INVENTOR.
FRED PERLIN
BY
ATTORNEY

Patented Sept. 12, 1950

2,521,743

UNITED STATES PATENT OFFICE 2,521,743

POCKET CAMERA

Fred Perlin, Bell Harbor, N. Y., assignor to Perlin Development Corporation, New York, N. Y., a corporation of New York Application November 28, 1947, Serial No. 788,418

21 Claims. (Cl. 95—38)

The present invention relates to cameras and, more particularly, to miniature cameras sometimes referred to as "button hole" or "detective" cameras.

An object of the invention is to provide a camera of small dimensions and simple construction.

Another object of the invention is to provide a camera wherein a film is supported so as to permit a plurality of exposures without displacement of the film relative to its support.

A further object of the invention is to provide a camera in which a film-carrying cartridge may be removably held in a housing in such a manner that, when the cartridge is withdrawn from the housing either before or after all the exposures available have been completed, all light will be effectively cut off from the film located inside the cartridge.

Still another object of the invention is to provide, in or for a camera, a film-carrying cartridge provided with a light trap which protects the film from accidental exposure to light until the cartridge has been inserted into the camera.

Yet a further object of the invention is to provide a new and simple shutter mechanism, particularly for miniature cameras, which is quick-acting in operation and forms a double seal to shut out the light.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Fig. 6a is a fragmentary view similar to Fig. 6, showing a modification;

Figure 1:
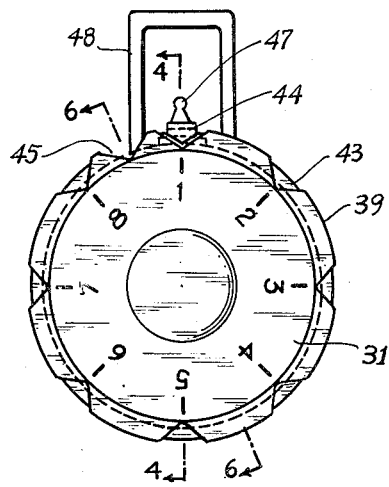
Figs. 1 and 2 are a rear view and a front view, respectively, of a camera according to the invention, the two views being relatively offset by 90°.

Referring to the drawing, the camera according to the invention comprises a housing, generally indicated at 13, and a cartridge, generally indicated at 14. The housing 13 has the general form of a socket, comprising the cylindrical wall 15 and the front wall 16 which is recessed at 17, 18 and apertured at 19. Recesses 17 and 18 serve to accommodate, respectively, a lever 20 and a disc 21, forming part of the shutter mechanism subsequently described. The shutter members 20, 21 are pivoted to the front wall 16 by means of pins 22 and 23, respectively, as seen in Figs. 3, 7, 8 and 9.

Figure 4:
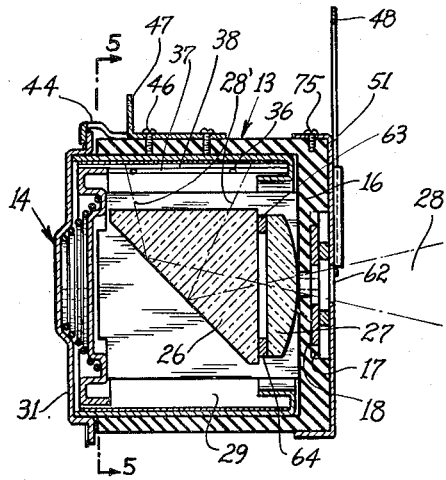
Fig. 4 is a longitudinal cross section taken on the line 4—4 of Fig. 1.
Figure 3:
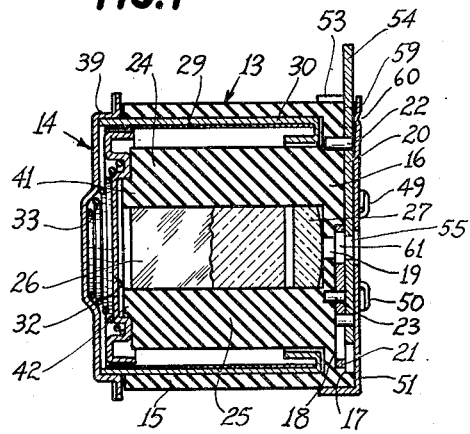
Fig. 3 is a longitudinal cross section taken on the line 3—3 of Fig. 2.
Figure 2:
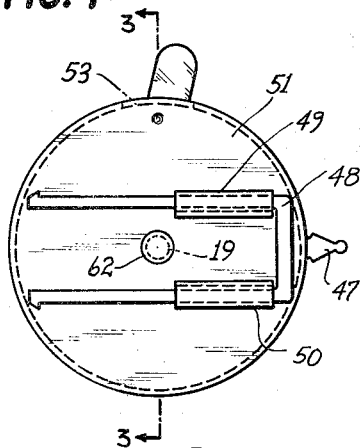

Formed integrally with the front wall 16 are two supporting members 24, 25 for a prism 26 and a lens 27, the lens and the prism serving to focus and to deflect the rays of the light cone 28 (Fig. 4), entering through the aperture 19, whereby an image will be projected upon the inner surface of a film 29 which rests against the cylindrical inner surface of wall 30 of the cartridge 14, provided the latter is held in its operative position as ilustrated in Figs. 3 and 4. Members 24, 25, which may be secured to the lens and the prism in any convenient manner, as by glueing, also serve as a mask for the deflected light cone 28' so as to permit only a rectangular portion thereof, of a width corresponding to the spacing between these two members, to impinge upon the surface of film 29.

Figure 6:
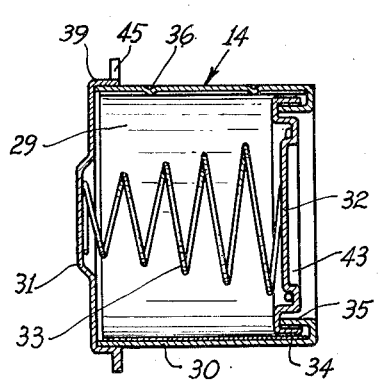
Fig. 6 is a cross sectional view of the cartridge, taken on line 6—6 of Fig. 1.

The cartridge 14 comprises, in addition to the cylindrical wall 30, a cup-shaped rear member 31 fitting tightly over the end of cylinder 30, a disc 32 movably fitting into the cylinder 30, and a conical spring 33 inserted between the disc 32 and the rear wall 31, the spring tending to displace the disc 32 toward the front of the cylinder. Disc 32 is formed with a recessed edge 34 cooperating with an inturned lip 35 of the cylinder 30, thereby forming a light trap which prevents the entrance of light into the interior of the cartridge whenever the disc 32 is in its rightmost position (as viewed in Fig. 6). The cylinder 30 may be formed with a pair of axially spaced dimples or projections 36, forming abutments for the two edges 37, 38 (Fig. 4) of the film 29 which has a length slightly less than the inner circumference of cylinder 30; thus, by its inherent tension and springiness, the film 29 will take the form of a cylinder concentric with the shell 30, its angular position relative thereto being defined by the projections 36.

Figure 5:
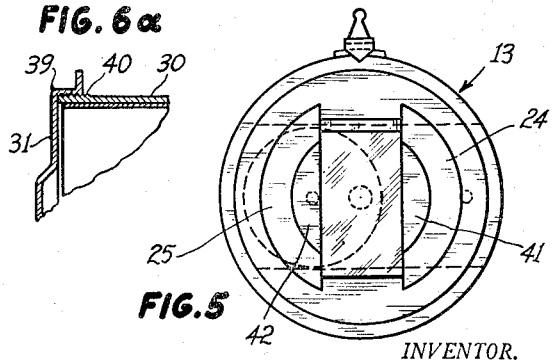
Fig. 5 is a rear view of the camera with the cartridge removed.
Figure 7:
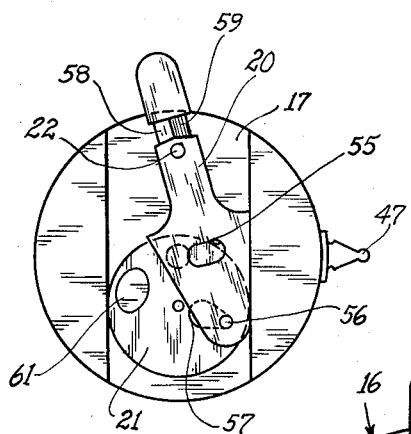
Figs. 7, 8 and 9 show the shutter mechanism in three different positions.
Figure 9:
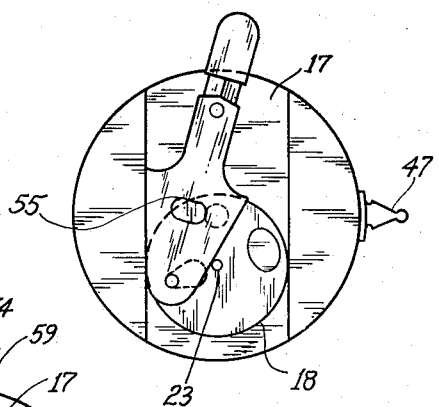
Figure 8:
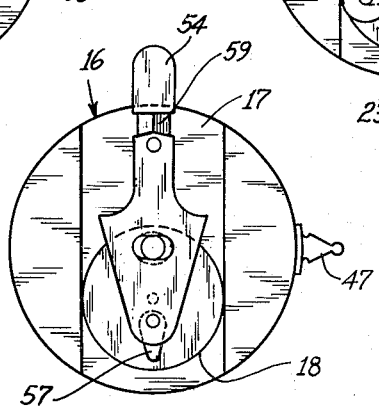

The conical form of coil spring 33 enables the latter to be collapsed to such an extent that disc 32 almost abuts the rear wall 31 of cartridge 14, as shown in Figs. 4 and 5. To insert a film 29 into the cartridge, the rear member 31 is disengaged from the cylinder 30 and the film thereupon positioned so that its front edge protrudes into the channel formed by the lip 35. Although, in some cases, it will be sufficient to press-fit the part 31 around the cylinder 30, the cylinder and the flange 39 of member 31 may also be threaded for this purpose as shown at 40 in Fig. 6a. The film 29 should be positioned in the cylinder 30 with its emulsion side facing inward, as will be readily understood.

The supporting members 24, 25 are formed at their rear ends with respective shoulders 41, 42 which engage the periphery of a circular recess 43, provided in disc 32, when the cartridge 14 is inserted into the housing 13; thus the disc 32 is pushed toward the rear of the cartridge, compressing the spring 33 and exposing the film 29 to any light entering the interior of the camera by way of the optical system 26, 27. Shoulders 41, 42 also act as guides to keep the disc 32 centered with respect to the cylinder 30, so as to prevent any scratching of the sensitive film surface by the circumference of the disc.

If the width of the image projected upon the film 29 is somewhat less than one-eighth of a full circle, it will be possible to make eight exposures on a single film by rotating the cartridge through an angle of 45° after each exposure. For this purpose, the flange 39 of part 31 is provided with eight uniformly spaced notches 43, numbered 1–8, respectively, which cooperate with a resilient latch 44 provided on the cylinder wall 15 of housing 13, whereby the cartridge 14 may be indexed successively in eight different angular positions. The rim 39 is further provided with a recess 45 which must be aligned with the latch 44 when the cartridge 14 is to be inserted into the housing 13. When the cartridge has reached its innermost position, it is rotated in a counter-clockwise direction (as viewed in Fig. 1) until the latch 44 engages the first notch, in which position the edge 38 of film 29 will have moved beyond the path of the light beam 28'. It will be seen that the latch 44 also serves to retain the cartridge 14 inside the housing 13, against the action of coil spring 33; thus, if the last exposure has been made and the cartridge is rotated to align the latch 44 once more with the recess 45, spring 33 will act to eject the cartridge automatically from the housing.

The latch 44 may be secured to the cylinder 15 by any convenient means, as by set screws 46, and may carry a projection 47 to serve as a back sight for the camera, cooperating with a retractable frame member 48 representing the associated front sight. The frame member 48 is slidably held in guides 49, 50 which are secured to a front cover 51 engaging the forward end of housing 13. The flange portion 52 of cover 51 is slotted at 53 to allow for the protrusion of an extension 54 of lever 20, and to provide room for the lateral movement thereof. Referring, now, more particularly to Figs. 7 through 9, it will be seen that lever 20 is provided with an elongated hole 55 and with a pin 56, the latter cooperating with a pear-shaped aperture 57 in the disc 21 whereby the latter is entrained by the pin 56 when the lever 20 is swung about its pivot 22, the disc rotating within the recess 18 about its pivot 23. Lever 20 is provided with a reduced portion 58 which is beveled to form a ridge 59; referring to Fig. 3, the cover 51 has a dimple or projection 60 whereby the surrounding cover portion will be resiliently deflected outwardly, as illustrated in this figure, whenever the projection 60 registers with the ridge 59. The latter is the case when the lever 8 is in its intermediate position shown in Fig. 8, and it will thus be seen that the resilient cover 51 acts as a spring tending to make this intermediate position of the lever 20 an unstable one, whereby the lever will normally be maintained in either of its two marginal positions illustrated in Figs. 7 and 9.

The disc 21 is further provided with a hole 61 which registers with holes 19 and 55 when the lever is in its intermediate, unstable position, whereby light from the outside may enter the lens 27 by way of the aperture 62 in cover 51 and the holes 19, 55 and 61 aligned therewith. To make an exposure, the projecting portion 54 of lever 20 is simply displaced from one marginal position (Fig. 7) into the other (Fig. 9), or vice versa, whereby the apertures 55 and 61 will move towards each other and will register for a brief instant (Fig. 8), the duration of the exposure being determined, at least in part, by the resiliency of the cover 51 and by the moment of inertia of the shutter mechanism 20, 21, as well as by the dimensions of apertures 55 and 61. When the shutter is in its marginal or stable position according to Fig. 7 or 9, the path of light toward the lens 27 will be interrupted by both shutter members 20 and 21.

Figure 10:
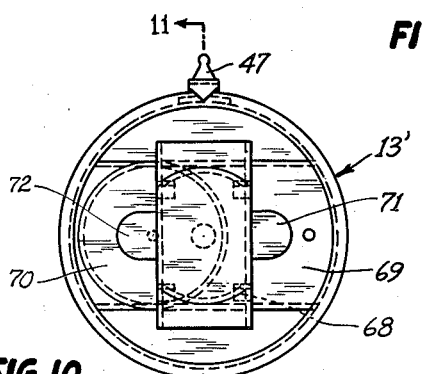
Fig. 10 is a view similar to Fig. 5, showing a modified form of camera according to the invention.
Figure 11:
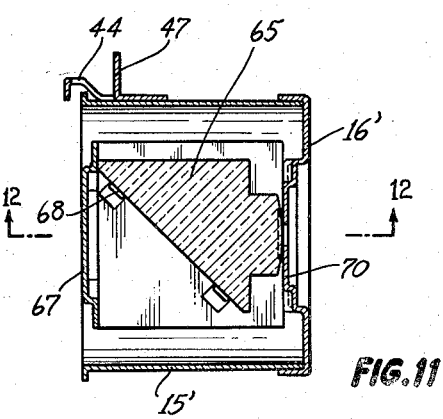
Fig. 11 is a longitudinal cross section taken on the line 11—11 of Fig. 10.
Figure 12:
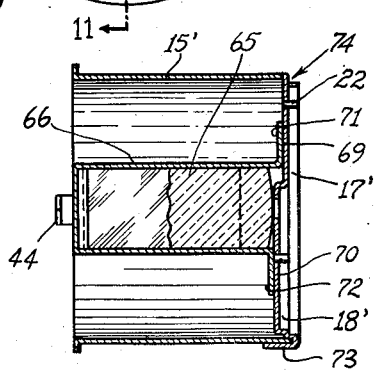
Fig. 12 is a longitudinal cross section taken on the line 12—12 of Fig. 11.

In the embodiment of the invention illustrated in Figs. 3 and 4, a clearance is provided between the lens 27 and the prism 26 by virtue of the insertion of spacers 63, 64 between these two elements. It will also be understood that, for focusing purposes, the distance between the lens 27 and the prism 26 may be made variable by any convenient means (not shown). Since, however, the dimensions of the camera according to the invention are preferably small (the drawing being a 2:1 enlargement of a camera actually constructed), such adjustment may usually be dispensed with. It will then be possible, according to a further feature of the invention, to combine the lens and the prism into a single optical element 65 as shown in the modification illustrated in Figs. 10 through 12. Furthermore, while in the embodiment previously described there has been shown a housing 13 made of moldable plastic material, Figs. 10, 11 and 12 illustrate a modification wherein the housing 13' is made of swaged sheet metal parts secured together in any practical manner, preferably by spot welding. The masking and supporting members 24, 25 have been replaced by a single, channeled member 66 which is closed at the back and bears a shoulder 67 to cooperate with the recess 43 of cartridge 14. Bent-over portions or lugs 68, partially punched out from the member 66, may form a seat for the element 65 which, in the present case, may be inserted into the member 66 from the front end thereof and will be held in place by the dished portion 70 of front wall 16', portions 69 and 70 being respectively formed so as to provide recesses 17' and 18' corresponding to the recesses 17 and 18 in Figs. 1–9. Lugs 71, 72 are integral with the member 66 and serve to secure the latter to portions 69 and 70, respectively, as by being spot welded thereto. The element 65 may be glued or otherwise fixed to the member 66 after being correctly located, as described, in its predetermined position relative thereto.

A flange 73, recessed at 74 to provide room for the lever 20 (not shown in Figs. 10–12), serves to mount the front part 16' upon the cylindrical wall portion 15'. It will be understood that an additional cover member, such as 51 in Figs. 3 and 4, fits over the flange 73 of part 16', and that the shutter mechanism to be associated with the housing 15' may be of the type disclosed in Figs. 7, 8 and 9. Cover 51 may be removably secured to the housing, either 13 or 13', in any convenient manner, as by the provision of set screws such as the screw 75 shown in Fig. 4.

Although the features of my invention herein disclosed are preferably incorporated in a camera of relatively small dimensions, it will be understood that the invention, by its nature, is not limited to miniature cameras and that, furthermore, any of its features or combination thereof may be used in association with conventional elements. Also, it will be appreciated that the lens-and-prism combination shown may be replaced by any optically equivalent system, as by a lens-and-mirror combination, and that various other modifications and adaptations of the specific embodiments described and illustrated may be made by those skilled in the art without departing from the spirit or exceeding the scope of the invention as defined in the objects and in the appended claims.

I claim:

1. A camera comprising: a housing having a socket; a cartridge removably fitting into said socket, said cartridge comprising a tubular shell adapted to have a film positioned adjacent to its inner surface, a closure member sealing off the rear end of said shell, a disc for closing the front end of the shell, said disc being slidable within the shell, means biasing the disc toward the front end of the shell, and means at said front end of the shell cooperable with the disc to limit forward movement of the disc and form a light trap; a projection carried by the housing within its socket and extending toward the mouth thereof to displace said disc against the action of its biasing means toward the rear end of the cartridge and thereby expose the film carried by the cartridge, upon insertion of the latter into the housing socket; latch means on the housing adapted to retain the cartridge in the socket; and an optical system in the housing adapted to project the image of an external object upon the film thus exposed.

2. A camera according to claim 1 wherein said biasing means comprises a conical coil spring inserted between said closure member and said disc.

3. A camera according to claim 1 wherein said closure member is removable from said shell to permit the insertion of a film into the latter.

4. A camera according to claim 1 wherein said latch means comprises a resilient member adapted to engage said closure member, the latter being formed with a peripheral recess permitting disengagement of said closure member from said latch means when said cartridge is rotated to align said recess with said resilient member.

5. A camera according to claim 4, further comprising a projection on said resilient member forming a back sight, a retractable frame member forming a front sight, and guide means on said housing slidably securing said frame member to the latter.

6. A camera according to claim 1, wherein said projection is adapted to cooperate with a shoulder on said disc so as to maintain the same in concentric relation to said shell during the displacement of the disc.

7. In a camera: a housing having a substantially cylindrical socket closed at its front by a wall having a light entry aperture; a film cartridge comprising a shell fitting into said socket, said shell being adapted to have a film positioned adjacent to its inner surface; a lens positioned adjacent to said light entry aperture; light directing means adapted to direct the light rays entering the lens through said aperture upon a portion of a film in the cartridge when the latter is in the socket; means mounting the lens and said light directing means in the housing, said means including a pair of spaced members extending rearwardly from the front wall of the housing within the socket; and closure means adapted to shut out light from the interior of the shell when the cartridge is removed from the housing, said closure means including a disc axially slidable inside the shell and engageable by said spaced members for displacement toward the rear of the shell when the cartridge is inserted into the socket.

8. In a camera, the combination according to claim 7, further comprising spacing means fixing the distance between said light directing means and said lens.

9. In a camera, the combination according to claim 7 wherein said lens and said light directing means are integral with each other.

10. In a camera: the combination of a body member having a socket opening to the back of the body member and closed at its inner end by the front wall of the body member, said front wall having a shutter-controlled light entry aperture opening to the socket; a film cartridge member insertable into the socket, said film cartridge member comprising a cylindrical shell and two end walls, one of which is depressible into the cylindrical shell; interengaging means on said depressible end wall and the cylindrical shell providing a light trap to exclude light from the interior of the cartridge member when said depressible end wall is in its normal cartridge closing position, means biasing the depressible end wall to its normal cartridge closing position while permitting depression of said end wall into the interior of the shell to enable exposure of a film overlying the inner surface of the cylindrical shell; means mounted in the socket of the body member positioned to engage the depressible end wall of the film cartridge member and depress the same as said members are assembled; optical means within the housing socket for directing light entering the aperture upon a defined area on the film in the cartridge member; relative rotation between said members presenting different defined areas of the film to the light projected by said optical means; and means for effecting such relative rotation between said members.

11. In a camera: a hollow body having a shutter-controlled light entry aperture in one wall thereof; a film cartridge adapted to have telescopic engagement with the hollow body, said film cartridge being hollow and adapted to hold a photosensitive element therein in position for exposure and having one wall thereof yieldingly maintained in closed position; means on the body engageable with said yieldable wall of the cartridge to move the same from its closed position during assembly of the cartridge and hollow body and thereby automatically communicate the interior of the cartridge with the inside of the hollow body and thus enable exposure of the photosensitive element to light rays which enter the hollow body through the light entry aperture; and optical means within the hollow body for directing such light rays onto the photosensitive element.

12. In a camera, the combination of: a body having a shutter-controlled light entry aperture; a hollow cartridge adapted to hold a photosensitive element therein in position for exposure and having one wall thereof yieldingly maintained in closed position, said cartridge being adapted for readily removable assembly with the body; means on the body positioned to engage with said yieldable wall of the cartridge to move the same out of its closed position during assembly of the cartridge with the body; and optical means carried by the body in position to enter the hollow cartridge as the latter is assembled with the body and adapted, when so disposed, to direct the light which passes through the aperture onto the photosensitive element.

13. In a camera: a hollow body having a shutter-controlled light entry aperture in one wall thereof; a film cartridge adapted to have telescopic engagement with the hollow body, said film cartridge being hollow and adapted to hold a photosensitive element therein in position for exposure and having one wall thereof yieldingly maintained in a closed position; means on the body engageable with said yieldable wall of the cartridge to move the same from its closed position during assembly of the cartridge and hollow body and thereby automatically communicate the interior of the cartridge with the inside of the hollow body and thus enable exposure of the photosensitive element to light rays which enter the hollow body through the light entry aperture; and optical means mounted within the hollow body in position to enter the hollow cartridge as the cartridge is assembled with the hollow body, said optical means being adapted to direct the light rays which enter the hollow body through the light entry aperture onto the photosensitive element.

14. In a camera, the combination of: a body member having a socket and a shutter-controlled light entry aperture leading to the socket; a light-tight film cartridge adapted to hold a photosensitive element in position for exposure and telescopically and removably fitting into the socket, said cartridge having one wall thereof yieldingly maintained in closed position; means carried by the body member engageable with said wall of the cartridge to move the same out of its closed position as the cartridge is inserted into the socket to thereby automatically communicate the interior of the cartridge with the inside of the socket, said means being so located with respect to the depth of the socket that as the cartridge is inserted into the socket the yieldable wall of the cartridge remains in its closed position until the cartridge has been inserted a sufficient extent to effect a light seal between it and the socket wall; and optical means within the socket for directing light entering the aperture onto a predetermined area of the photosensitive element.

15. In a camera, the combination of: a body having a socket; a film cartridge adapted to hold a photosensitive element to be exposed, said film cartridge comprising a cylindrical shell with an inturned flange at one end thereof, an end wall slidable within the shell and engageable with the inturned flange, and a spring inside the shell yieldingly holding said end wall in its closed position, said cartridge being insertable into the socket with its yieldable end wall foremost; a projection on the body within the socket positioned to engage said yieldable end wall of the cartridge and depress the same into the interior of the cartridge as the cartridge is inserted, said cartridge being rotatable within the socket; and latch means for removably holding the cartridge in the socket, said latch means being maintained in engagement by the force exerted by the spring in the cartridge reacting upon the projection so that upon release of the latch said spring automatically ejects the cartridge from the socket.

16. In a camera: a hollow body member having a front wall provided with a shutter controlled light entry aperture; a cartridge member adapted to hold a photosensitive element to be exposed, said cartridge member having end and side walls and one of its end walls being depressible into the interior of the cartridge member to enable exposure of a photosensitive element in the cartridge member; said body and cartridge members being telescopically fitted together and being relatively rotatable with respect to each other about the axis of the light entry aperture; means on the body member for depressing the depressible end wall of the cartridge member as these members are assembled so that upon assembly thereof the interiors of said members are brought into open communication to thereby enable exposure of a photosensitive element in the cartridge member; optical means mounted within the body member for directing light entering through the aperture upon a defined area of a photosensitive element positioned in the cartridge member; relative rotation of said members presenting different defined areas of the photosensitive element to the light directed by the optical means; means for effecting relative rotation between said members; and means for automatically returning the depressible end wall of the cartridge member to its position closing the cartridge member as said members are disassembled.

17. In a camera, the combination of: a housing providing a socket opening to the rear of the housing, the front and side walls of the socket being imperforate except for a shutter controlled light entry aperture in the front wall; a lens fixed on the front wall across said aperture; a film cartridge rotatably and removably received in the socket, said film cartridge comprising a cylindrical shell having a length of film overlying its inner wall surface, end walls closing the ends of the shell, one of said end walls being depressible into the shell to enable exposure of the film, and a spring inside the shell resisting depression of said depressible end wall; means on the housing for depressing said depressible end wall and thereby loading its spring during insertion of the cartridge into the socket; a light directing element within the socket behind the lens to direct light rays passing through the lens onto a defined area of the film; rotation of the cartridge in the socket enabling exposure of different areas of the film; and releasable latch means for holding the cartridge in the socket against the force of the spring in the cartridge so that upon release of the latch means said spring automatically ejects the cartridge and returns the depressible end wall to its closed position.

18. In a camera, the combination set forth in claim 17 further characterized by the fact that the means on the housing for depressing the depressible end wall of the cartridge comprises a boss extending into the socket from the front housing wall and substantially filling the socket so as to enter the interior of the cartridge as the cartridge is inserted into the socket; and further characterized by the fact that the light directing means is mounted in said boss.

19. In a camera adapted for use with a film cartridge having a depressible end closure: a hollow body defining a cylindrical cartridge receiving socket opening to the rear and adapted to receive a cartridge with its depressible end closure facing the front wall of the camera body; a light admitting lens mounted in the front wall of the camera body coaxially with the cylindrical socket; boss means fixed in the socket for engaging and depressing the depressible end closure of the cartridge upon insertion of the latter into the socket, the rearmost portion of said boss means presenting contact surfaces spaced from the lens axis and disposed at opposite sides thereof so that during insertion of a cartridge the depressible end closure thereof engaged with said surfaces is held against tipping; optical means within the socket positioned to direct light rays passing through said lens and into the socket substantially radially from the lens axis; and means on the camera body for releasably holding a cartridge in the socket.

20. In a camera, the structure set forth in claim 19 further characterized by the fact that said boss means has a cylindrical wall concentric with the lens axis and in close juxtaposition to the cylindrical wall of the socket to define an annular space to receive the side wall of a cartridge inserted into the socket.

21. In a camera, the structure set forth in claim 19 further characterized by the fact that said boss means has guide surfaces at an angle to its contact surfaces to interengage with guide surfaces on the depressible end closure of a cartridge inserted into the socket and thereby hold the depressible end closure against lateral displacement and guide the same along the axis of the socket during insertion of the cartridge.

FRED PERLIN.

REFERENCES CITED

The following references are of record in the file of this patent:

UNITED STATES PATENTS

| Number | Name | Date |
|---|---|---|
| 517,539 | Casler | Apr. 3, 1894 |
| 546,198 | Slayton | Sept. 10, 1895 |
| 615,297 | Mosher | Dec. 6, 1898 |
| 687,592 | Barnell | Nov. 26, 1901 |
| 866,257 | Case | Sept. 17, 1907 |
| 1,070,400 | Brieloff | Aug. 19, 1913 |
| 1,215,290 | London | Feb. 6, 1917 |
| 1,955,300 | Kurnick | Apr. 17, 1934 |
| 1,957,043 | Harlow | May 1, 1934 |
| 2,083,492 | Cheshire | June 8, 1937 |

FOREIGN PATENTS

| Number | Country | Date |
|---|---|---|
| 18,336 | Great Britain | Aug. 3, 1910 |